United States Patent [19]

Sullivan

[11] 4,009,734
[45] Mar. 1, 1977

[54] COILED TUBING
[75] Inventor: Dennis W. Sullivan, Willoughby Hills, Ohio
[73] Assignee: Parker-Hannifin Corporation, Cleveland, Ohio
[22] Filed: Feb. 26, 1976
[21] Appl. No.: 661,535
[52] U.S. Cl. .............................. 138/125; 138/118; 138/177; 138/DIG. 7
[51] Int. Cl.$^2$ ........................................ F16L 11/00
[58] Field of Search .......... 138/118, 125, 126, 137, 138/177, 178, DIG. 7, DIG. 8

[56] References Cited

UNITED STATES PATENTS

| | | | |
|---|---|---|---|
| 2,939,860 | 6/1960 | Schramm | 138/DIG. 7 |
| 3,021,871 | 2/1962 | Rodgers | 138/118 |
| 3,211,473 | 10/1965 | Schmid | 138/118 |
| 3,245,431 | 4/1966 | Coe | 138/137 |
| 3,253,618 | 5/1966 | Cook | 138/125 |
| 3,253,619 | 5/1966 | Cook et al. | 138/125 |
| 3,581,778 | 6/1971 | Karejwa | 138/137 |

Primary Examiner—Richard E. Aegerter
Assistant Examiner—Richard R. Stearns
Attorney, Agent, or Firm—Donnelly, Maky, Renner & Otto

[57] ABSTRACT

A flexible self-retracting coiled tubing having desirable recoil strength and elastic memory is described. The coiled tubing is adaptable especially as a self-retracting air tube for transmitting fluids under pressure to pneumatic equipment. The coiled tubing comprises an extruded seamless plastic tube prepared by extruding a mixture comprising a chemically extended polyester and from about 10% to about 50% of a polybutylene terephthalate polymer.

8 Claims, 2 Drawing Figures

COILED TUBING

BACKGROUND OF THE INVENTION

Coiled tubing self-retracting which fluids may pass under high pressure have been known for some time and have been utilized in conjunction with pneumatic equipment. The use of coiled flexible and self-retracting tubing eliminates the need for reels or counterbalances for retracting or storing the tubing when the equipment is not in use. Various devices have been suggested to maintain the tubing in its coiled form, and these include devices which are applied to the exterior of the tubing. Alternatively, it is possible to prepare tubing in a coiled form wherein wire is molded into the rubber or plastic tubing in order to provide additional recoil strength to a coil formed from the tubing which is above and beyond that strength which can be obtained from the rubber or plastic by itself. Incorporation of such wires has not resolved the problems completely since the wires have a tendency to break through continued use of the tubing.

Although the desirability of eliminating externally applied devices or wire reinforcements has been appreciated for some time, few rubbery or plastic materials have been known which can be utilized in the preparation of coiled tubing having the desirable recoil strengths. U.S. Pat. No. 3,021,871 describes a coiled nylon tubing which is useful for transmitting fluids under pressure to pneumatic equipment and which exhibits the desirable recoil properties. It is suggested therein that coiled tubing made of other existing plastics such as polyvinyl chloride, polyethylene, polystyrene, and the like, do not exhibit the desirable characteristics or possess sufficient elastic memory to be acceptable. For example, polystyrene, though quite pliable, reportedly does not have sufficient stiffness to provide the necessary resilience to the coiled shape, and none of the three plastics mentioned had sufficient tensile strength to withstand the necessary operating pressures of a tubing using a practical wall thickness.

Studies involving the potential application of other types of plastic materials, both new and old, or combinations thereof, have continued in an effort to develop plastic materials which would be useful as tubing materials and particularly as coiled tubing exhibiting the desirable recoil strength and memory. The invention of this application relates to such a discovery.

SUMMARY OF THE INVENTION

The present invention relates to a self-retracting coiled tubing which is useful for transmitting fluids under pressures of about 90 to about 200 p.s.i. and which possesses desirable recoil strengths and elastic memory. The coiled tubing of this invention is an extruded seamless resilient plastic tubing comprising a mixture of a chemically extended polyester and from about 10% to about 50% of a polybutylene terephthalate polymer. More preferably, the thermoplastic material utilized to form the tubing comprises a mixture of from about 75 to about 90% of a chemically extended polyester and from about 10 to 25% of a polybutylene terephtalate polymer. Coiled tubing made from this material and with wall thickness adequate to withstand the pressures normally employed exhibits desirable elastic memory, improved heat resistance and does not emit toxic fumes if ignited.

DESCRIPTION OF THE PREFERRED EMBODIMENTS

Figure 1:
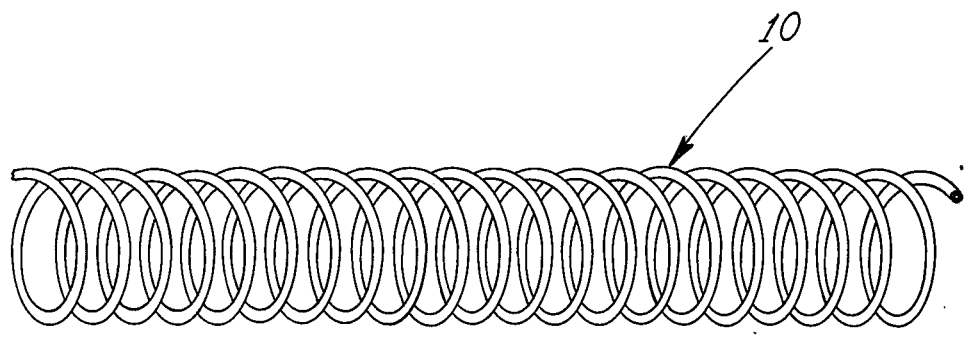
FIG. 1 illustrates a coiled tubing of the invention under some tension.

The plastic material that is utilized for the preparation of the tubing of this invention comprises a chemically extended polyester and a polybutylene terephthalate polymer. In general, the mixture will comprise from about 50 to about 90% of the chemically extended polyester and from about 10 to about 50% of the polybutylene terephthalate polymer. In a preferred embodiment the mixture will contain from about 10 to about 25% of the polybutylene terephthalate polymer.

Examples of chemically extended polyesters which are useful in the plastic mixtures used to prepare the tubing of this invention are known and described in, for example, U.S. Pat. Nos. 3,651,014, 3,766,146 and 3,763,109. The elastomers described in these patents are contemplated as being useful in this invention, and the disclosures of these patents are incorporated herein by reference. In general, the chemically extended polyesters are prepared from mixtures comprising a long-chain glycol, one or more dicarboxylic acids or their esters or ester-forming derivatives, and one or more low molecular weight aliphatic diols. Included among the long-chain glycols are those having a molecular weight of about 400 to about 4,000, and a carbon-to-oxygen ratio in the long-chain glycol in excess of about 2:5. Examples of these glycols include poly(1,2- and 1,3-propylene oxide) glycol, poly(tetramethylene oxide) glycol, etc. The dicarboxylic acids utilized in preparing the chemically extended polyesters are those having a molecular weight less than about 300, and they may be aromatic, aliphatic or cycloaliphatic dicarboxylic acids. Representative dicarboxylic acids include terephthalic and isophthalic acids, dibenzoic acid, etc. Included among the low molecular weight diols used in the preparation of the chemically extended polyesters are acyclic, alicyclic and aromatic dihydroxy compounds. Preferred are diols with two to 15 carbon atoms such as ethylene glycol, propylene glycol, tetramethylene glycol, etc.

Copolyesters of these types are available commercially from E. I. du Pont de Nemours Company under the general trade designation "Hytrel". A variety of Hytrel polyester elastomers is available from du Pont and these are contemplated as being useful in the preparation of the flexible coiled tubing of the invention. A particularly preferred example of a chemically extended polyester material which can be utilized in this invention is "Hytrel 6345" which is a 63D durometer polymer.

Although Hytrel polyester elastomers have been utilized in the formation of tubing and hose materials, the preparation of self-retracting coiled tubing from such materials has not met with significant success since the chemically extended polyester is too soft and the coiled tubing do not exhibit the desired recoil strength and elastic memory. The deficiencies of such materials have now been overcome by preparing coiled tubing from a plastic material which is a mixture of the chemically extended polyesters and a polybutylene terephthalate polymer. It has been found that the incorporation of from about 10 to about 50% of a polybutylene terephthalate polymer into the Hytrel polyester results in a tubing material which can be formed into a coiled flexible tubing having the desired recoil strength and elastic memory.

Polybutylene terephthalate polymers are obtained by the polymerization condensation of terephthalate esters such as dimethyl terephthalate and 1,4-butane diol, and these polymers are available commercially. One example of a commercially available polybutylene terephthalate polymer is a polymer available from the General Electric Company under the general trade designation "Valox 310" which is an unreinforced polymer having a specific gravity at 73° F. of 1.31, a tensile strength of about 8,000 p.s.i. as determined by ASTM Test Method D638, and a specific volume of about 21 cubic inch/lb.

The tubing which is utilized in the preparation of the coiled tubing of the invention is obtained by extruding the plastic mixtures described above utilizing standard apparatus and techniques. The dimensions of the extruded tubing such as inner diameter and wall thickness are determined from a consideration of the potential end use of the tubing. Thus, the wall diameter should be sufficient to withstand the internal pressures, e.g., up to about 200 p.s.i. and generally between 90-120 p.s.i., usually utilized in transmitting fluids to pneumatic equipment. On the other hand, the wall thickness should not be so large as to result in a tubing material which is itself so heavy that any elastic memory imparted to the coiled tubing is immediately overcome by the weight of the tubing. In general, therefore, the tubing used in this invention will have inner diameters within the range of from about 0.2 inch to about one inch and preferably from about 0.25 to about 0.75 inch, and average wall thicknesses of from about 0.01 to about 0.1 inch. Working pressures for such tubing may be from about 200 p.s.i. at room temperature to about 100 p.s.i. at 190° F.

The coiled tubing such as illustrated in FIG. 1 may be prepared from the extruded tubing by any known technique such as by wrapping the tubing around a heated mandrel of a given diameter and heat forming into a series of coils. The coiled tubing is then cooled to harden the tubing in the given coiled shape. The coiled shape thus imparted to the tubing will be retained so long as the material is not subjected to softening temperatures, and air pressure or stretching of the tubing will not permanently distort the coiled shape. Therefore, upon removal of any stretching forces or air pressure, the tubing retracts to its essentially original coiled configuration. This elastic memory or recoil strength possessed by the coiled tubing of the invention is dependent upon the properties of the plastic mixture utilized to form the tubing.

The following example illustrates a method of preparing self-retracting coiled tubing in accordance with the present invention. All parts and percentages are by weight. A mixture comprising 80 parts of "Hytrel 6345", a chemically extended polyester available from the E. I. du Pont de Nemours Company and having a durometer hardness of 63D, and 20 parts by weight of a polybutylene terephthalate polymer available from The General Electric Company under the trade designation "Valox 310" is blended and extruded into a hollow tubing characterized as having an inner diameter of 0.250 inch, an outer diameter of 0.375 inch, and an average wall thickness of from 0.063 to about 0.071 inch. The tubing is coiled by wrapping the tubing around a mandrel 3 inches in diameter and passing hot water through the tubing to soften the plastic material. When the tubing has softened sufficiently, cold air or water is passed through the tubing to cool the tubing and harden the plastic material in the coiled configuration.

A test unit comprising nine complete coils of the coiled tubing prepared above is subjected to the following test to determine the recoil strength and "elastic memory" of the coiled tubing. The test procedure is as follows:

1. The test unit height is measured resting on a flat surface with its coils together;
2. The height of the test unit was measured suspended in air with no additional weight attached after the following time increments: instantaneously, 1 minute, 5 minutes and 15 minutes;
3. A one pound weight was attached, and the test unit height was again measured after the following time increments: instantaneously, 1 minute, 5 minutes and 15 minutes;
4. The weight was removed and the test unit height was measured after the following time increments: instantaneously, after 5 minutes and 19 hours;
5. A 2 pound weight then was attached and the test unit height again measured after a time increment of 1 minute, 5 minutes and 15 minutes; and
6. After being suspended for 15 minutes, the two pound weight was removed and measurements were again taken instantaneously, after 1 minute, 5 minutes, 15 minutes and 19 hours.

The results of this test are shown in the following table:

| Condition | Coil Length in Inches |
|---|---|
| Resting on surface | 3 -⅝ |
| Suspended with no weight attached | |
| Instantaneous | 4 -¾ |
| One minute | 4 -¾ |
| Five minutes | 4 -⅞ |
| 15 minutes | 4 -⅞ |
| One pound weight attached | |
| Instantaneous | 12 -¾ |
| One minute | 14 |
| Five minutes | 14 -½ |
| 15 minutes | 15 |
| One pound weight removed | |
| Instantaneous | 7 -½ |
| Five minutes | 5 -⅞ |
| 19 hours | 5 -9/16 |
| Two pound weight attached | |
| One minute | 22 -¾ |
| Five minutes | 24 -½ |
| 15 minutes | 25 -¾ |
| Two pound weight removed | |
| Instantaneous | 11 |
| One minute | 8 |
| Five minutes | 6 -¾ |
| 15 minutes | 6 -¼ |
| 19 hours | 5 -⅞ |

It can be seen from the above data that the coiled tubing prepared in accordance with the above example exhibits an acceptable degree of elastic memory.

Figure 2:
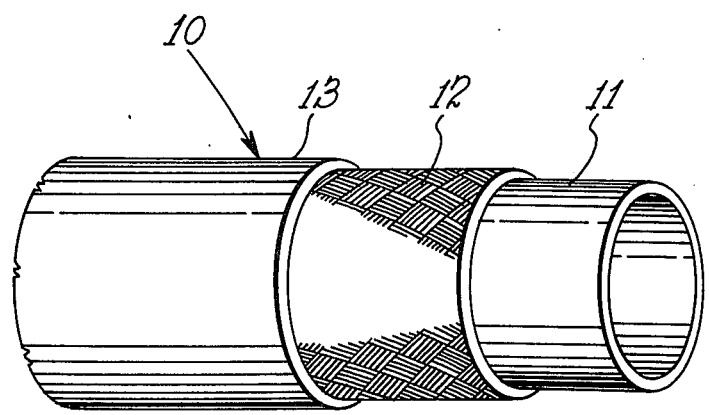
FIG. 2 is a side elevation, partly broken away in successive structural layers, of a length of an example of the tubing of the invention.

FIG. 2 illustrates another embodiment of the invention wherein the tubing 10 comprises a core tube 11 of a mixture of a chemically extended polyester and from about 10 to about 50% of a polybutylene terephthalate polymer of the type described above, an outer sheath 13, and a reinforcement layer 12. The reinforcement layer 12 may be either in bonded or unbonded contact with the outer sheath 13 and may be applied to the core tube 11 prior to coiling either as a braid or as a spirally wrapped layer.

Sheath 13 may be made of any of the known synthetic plastics which have been useful in the formation of tube structures, or sheath 13 may be made of the same plastic mixture used to form the core tube. Examples of the known plastic material which may be utilized as the outer sheath 13 include the chemically extended polyesters described above, polyamides (polyhexamethylene adipamide) and other nylon-type materials, polyesters such as polyethylene terephthalate, poleolefins such as polyethylene and polypropylene, polyvinyl chloride, polyacrylonitrile, polystyrene, polyurethanes and rubbers. The selection of the particular synthetic plastic useful as the sheath material will depend upon the particular end use of the tubing and the properties desired of the sheath. Naturally, the selection of the material used and the thickness of the reinforcing layer and the outer sheath will take into consideration the effect that these materials will have on the elastic memory of the coiled tubing. The reinforcement layer and the outer sheath do not significantly reduce the elastic memory of the coiled tubing. The reinforcing material may be, for example, fibrous strands of either nylon, dacron, Kevlar, rayon, which are all known to be useful as reinforcing materials in composite hoses and tubings.

Although the tubing illustrated in FIG. 2 contains a reinforcing layer and an outer sheath, the present invention contemplates coiled tubing structures with or without the reinforcing and/or sheath layers, and these various layers may be in bonded or unbonded contact with each other.

The embodiments of the invention in which an exclusive property or privilege is claimed are defined as follows:

1. A self-retracting flexible coiled tubing structure to transmit fluids under pressure comprising an extruded seamless tube of a mixture of a chemically extended polyester and from about 10% to about 50% of a polybutylene terephthalate polymer.

2. The coiled tubing structure of claim 1 wherein the tube comprises a mixture of a chemically extended polyester and from about 10% to about 25% of a polybutylene terephthalate polymer.

3. The coiled tubing structure of claim 1 wherein the chemically extended polyester is a polyester obtained by the polymerization of a mixture of a long-chain glycol, one or more dicarboxylic acids or their esters or ester-forming derivatives, and one or more low molecular weight aliphatic diols.

4. The coiled tubing of claim 1 wherein the wall thickness of the tube is within the range of about 0.01 to about 0.10 inch and the inside diameter of the tubing is within the range of about 0.2 to about one inch.

5. The tubing structure of claim 1 wherein there is also a stranded reinforcement over the tube.

6. The tubing structure of claim 5 wherein there is a sheath of plastic material over the reinforcement.

7. A self-retracting flexible hollow coiled tubing adapted to transmit fluids under high pressure comprising a seamless plastic tube comprising a mixture of a chemically extended polyester with a durometer D hardness of about 63 and from about 10 to 25% of a polybutylene terephthalate polymer.

8. The coiled tube of claim 7 wherein the polybutylene terephthalate polymer has a specific gravity of about 1.31 g/cc at 73° F., a specific volume of about 21 cubic inch/lb. and a tensile strength of about 8,000 p.s.i.

* * * * *